United States Patent
Rausch (10) Patent No.: US 12,038,093 B2
(45) Date of Patent: Jul. 16, 2024

(54) ELECTROPNEUMATIC FIELD DEVICE

(71) Applicant: SAMSON Aktiengesellschaft, Frankfurt am Main (DE)

(72) Inventor: Sven Rausch, Nidderau (DE)

(73) Assignee: SAMSON AKTIENGESELLSCHAFT, Frankfurt am Main (DE)

(*) Notice: Subject to any disclaimer, the term of this patent is extended or adjusted under 35 U.S.C. 154(b) by 0 days.

(21) Appl. No.: 17/920,939

(22) PCT Filed: May 7, 2021

(86) PCT No.: PCT/EP2021/062210
§ 371 (c)(1),
(2) Date: Oct. 24, 2022

(87) PCT Pub. No.: WO2021/224484
PCT Pub. Date: Nov. 11, 2021

(65) Prior Publication Data
US 2023/0204112 A1 Jun. 29, 2023

(30) Foreign Application Priority Data
May 7, 2020 (DE) .................. 20 2020 102 570.8

(51) Int. Cl.
F16K 15/14 (2006.01)
F16K 17/02 (2006.01)

(52) U.S. Cl.
CPC ............ *F16K 15/148* (2013.01); *F16K 17/02* (2013.01)

(58) Field of Classification Search
CPC .... F16K 15/148; F16K 17/02; F16K 15/1402; F16K 15/142; F16K 31/126; F15B 21/044
See application file for complete search history.

(56) References Cited

U.S. PATENT DOCUMENTS 2,787,400 A 4/1957 Fritsch
5,439,021 A * 8/1995 Burlage ................ G05D 16/20
137/84

(Continued)

FOREIGN PATENT DOCUMENTS

DE 102004044770 B3 6/2006
DE 202015100970 U1 3/2015

(Continued)

OTHER PUBLICATIONS

PCT International Preliminary Report on Patentability and Written Opinion mailed Nov. 17, 2022 issued in counterpart PCT Application No. PCT/EP2021/062210, 5 pages in English.

(Continued)

*Primary Examiner* — Jessica Cahill
(74) *Attorney, Agent, or Firm* — Juan Carlos A. Marquez; Marquez IP Law Office, PLLC (57) ABSTRACT

An electropneumatic field device, such as an electropneumatic setting regulator or the like, incorporates a protective housing which has a housing cover and in which at least one electronic component and at least one pneumatic component are arranged. The protective housing is connected to at least one electric field input, at least one pneumatic supply inlet, and at least one pneumatic field outlet. The electric field input is connected to the electronic component, the pneumatic supply inlet and the pneumatic field outlet are coupled to the pneumatic component, the pneumatic component is connected to the electronic component for signaling purposes, and the protective housing has a ventilation device paired with the pneumatic component. The pneumatic component is at least partly surrounded by the housing cover which is releasably connected to the protective housing, and the ventilation device of the protective housing is integrated into the housing cover.

22 Claims, 3 Drawing Sheets

(56) References Cited

U.S. PATENT DOCUMENTS

| | | | | |
|---|---|---|---|---|
| 9,989,159 | B2* | 6/2018 | Winkler | F16K 47/08 |
| 10,228,066 | B2* | 3/2019 | Winkler | F16K 15/00 |
| 10,948,097 | B2* | 3/2021 | Dörfler | B60N 2/914 |
| 2005/0229593 | A1* | 10/2005 | Matsumoto | F15B 15/202 |
| | | | | 60/469 |
| 2013/0327403 | A1* | 12/2013 | Jensen | F16K 37/0083 |
| | | | | 251/12 |
| 2016/0356396 | A1* | 12/2016 | Kah | F16K 31/42 |
| 2019/0353268 | A1 | 11/2019 | Dorfler et al. | |

FOREIGN PATENT DOCUMENTS

| | | |
|---|---|---|
| DE | 102018112091 A1 | 11/2019 |
| EP | 2016318 B1 | 1/2009 |
| EP | 3137796 B1 | 3/2017 |

OTHER PUBLICATIONS

PCT International Search Report mailed Sep. 2, 2021 issued in counterpart PCT Application No. PCT/EP2021/062210, 2 pages in English.

German Search Report mailed Mar. 30, 2021 issued in counterpart German application DE 20 2020 102 570,8, 5 pages in German.

* cited by examiner

ELECTROPNEUMATIC FIELD DEVICE

The present application is a National Stage application of PCT International Application No. PCT/EP2021/062210, filed on May 7, 2021, the disclosure of which is hereby incorporated by reference in its entirety.

The invention relates to an electropneumatic field device of the type specified in the preamble of claim 1.

Electropneumatic field devices of this type have been known for some time and are constituted, for example, by electropneumatic positioners, by I/P converters or the like. An electropneumatic field device is often used as a control unit for controlling a pneumatic actuator of a process plant, for example a petrochemical plant, a food industry plant or the like. An actuator of this kind in turn operates a control valve for controlling a process fluid flow.

A generic electropneumatic field device comprises a protective housing that has a housing cover and in which at least one electronic component and at least one pneumatic component are arranged. The protective housing is provided with an electric field input, a pneumatic supply inlet and a pneumatic field outlet, each of which is arranged in or on the protective housing and is accessible from the outside. The electric field input is connected to the electronic component inside the protective housing. The pneumatic supply inlet and the pneumatic field outlet are pneumatically coupled to the pneumatic component. The pneumatic component is connected to the electronic component for signaling purposes, and is controlled thereby.

For the protection of the electropneumatic field device, a ventilation device is provided in the protective housing. The ventilation device is used to prevent overpressure above a specified threshold that originates from the pneumatic component within the protective housing of the field device. Such overpressure can be caused, for example, by pressure peaks in the pneumatic component which are equalized by a safety valve of the pneumatic component into the interior of the protective housing.

A ventilation device of the protective housing is therefore required in order to equalize the overpressure thus created in the protective housing to ambient pressure.

DE 20 2015 100 970 U1 discloses a vent valve for venting fluidic systems. This vent valve comprises a vent valve body with a port and an outlet orifice covered by a diaphragm. An increase in pressure in the fluid inside the vent valve port to above a certain threshold causes the diaphragm to lift and vent through its outlet orifice.

Another ventilation device for fluidic systems is also known from EP 3 137 796 B1.

EP 2 016 318 B1 describes a process valve that has a chassis aggregation with a modular structure for control electronics, i.e. for monitoring, control and/or regulating electronics. Depending on the requirements of the process valve, this chassis aggregation is optionally composed of a predetermined limited supply of modules in conjunction with a cover element, of which there are two different designs. The respective cover elements are designed to include an operating unit, which have a display and operating element, and accommodate the entire control electronics. Depending on the requirements of the process valve, the control electronics are equipped with different circuit boards. All the modules and the respective cover element can be connected to one another via identical connection points. The housing aggregation is connected to an actuator housing of the process valve with the interposition of an adapter part. A retaining ring is arranged in the adapter part, which allows the housing aggregation to rotate relative to the actuator housing.

The disadvantage of the prior art electropneumatic field devices, however, is that, for one thing, they are very large and, secondly, different designs thereof require individually adapted and configured housings. However, there is a need for a modular design with a uniform protective housing for different variants of the electropneumatic field devices, in which different I/P converters can be arranged, for example. The ventilation device should also work for different mounting positions of electropneumatic field devices. In particular, these field devices should also be suitable for explosion-proof applications. In field devices of this type, only certain gap spacings are permitted for the protective housings.

In addition, the protective housings must be of a pressure-resistant design. The ventilation device must also meet explosion protection requirements.

It is the object of the invention to further improve on an electropneumatic field device of the type specified in the preamble of claim 1 in such a way that a compact design as well reliable venting are achieved whilst avoiding the above mentioned shortcomings.

This object is accomplished by the characterizing features of claim 1 in conjunction with the features of its preamble.

The dependent claims relate to advantageous further embodiments of the invention.

The invention is based on the insight that by integrating the ventilation device into the housing cover and arranging the housing cover in the area of the pneumatic component, both a compact design can be created and reliable venting can be ensured. In addition, this opens up further design options that allow the ventilation device to be optimized even more.

According to the invention, the pneumatic component, at least certain areas thereof, is therefore surrounded by the housing cover which is releasably connected to the protective housing, and the ventilation device of the protective housing is integrated into the housing cover. As a result, internal space is not restricted by the ventilation device, and different variants of pneumatic components can thus be integrated into the interior of the protective housing.

In particular, the electronic component and/or the electric field input is located at an area in the protective housing that is remote from the housing cover. This makes it easier to achieve certain IP protection ratings for the field device, i.e. the suitability and approval of the electrical components of the field device for use in various environmental conditions, while ensuring protection of people from potential hazards during their use.

In one embodiment of the invention, the housing cover surrounds the pneumatic supply inlet in such a manner that the latter can be freely connected to a pneumatic source. This facilitates installation without restricting accessibility to the pneumatic supply inlet.

To permit easy replacement of the pneumatic component and simple arrangement of the ventilation device, which is integrated in the housing cover, close to the pneumatic component, the housing cover laterally surrounds the entire pneumatic component. With the housing cover removed, the pneumatic component can be easily grasped from the side for disassembly. With the housing cover in place, the ventilation device is located directly next to the pneumatic component.

Preferably, the ventilation device comprises two chambers arranged in series, with the first chamber comprising at least one check valve connected to an interior of the protective housing such that, when the pneumatic component is vented, air from the interior passes through the check valve into the first chamber, then into the second chamber from where it then flows out of the protective housing. This results in a successive pressure reduction of the fluid flowing out of the pneumatic component or out of other pneumatic components arranged in the protective housing via the interior, the first chamber and the second chamber during venting. This considerably reduces danger to the immediate surroundings of the protective housing during venting.

In order to reliably prevent rainwater, for example, from entering the protective housing via the housing cover, a type of labyrinth seal is provided that protects against moisture entering the first and second chambers. However, this type of labyrinth seal should still permit venting of the pneumatic component via the check valve and the first and second chambers.

This labyrinth seal may comprise a segmented web that separates the first chamber from the second chamber. In addition or as an alternative, the labyrinth seal can also take the form of at least one shoulder arranged between the first chamber and the second chamber, which shoulder slopes downward towards the pneumatic supply inlet. These measures, which are easy to implement from a manufacturing point of view, allow the desired type of labyrinth seal to be implemented without any problem.

For rapid venting in the event of venting, the second chamber can have vent openings as part of the labyrinth seal which vent openings are arranged laterally and/or on the front face in the housing cover and which connect the second chamber to the outside. This will allow any jet water that may penetrate the second chamber to also drain off again immediately. Intrusion of jet water into the first chamber can thus be avoided.

Preferably, the check valve is constituted by a diaphragm disposed over a vent opening, which vent opening connects the interior of the protective housing to the first chamber. In this design, the installation space required for the check valve can be kept extremely small and thus also the field device as a whole can be made compact in size.

Additional protection against water penetration can also be achieved in a simple manner by raising the vent opening relative to its adjacent area on the side facing the membrane.

In one embodiment of the invention, multiple check valves are provided. These check valves can be evenly spaced around the circumference, preferably in a plane perpendicular to a longitudinal axis of the protective housing. Regardless of where venting of the pneumatic component occurs, the air can always escape by the shortest possible route via the nearest check valve. For this reason, the ventilation device has a response behavior with a short reaction time, i.e. with an extremely short time delay in case of venting.

In particular with a view to a compact design as well as easy installation and manufacture, the housing cover is of a two-part design. The housing cover includes an inner ring and an outer ring. The inner ring and the outer ring are arranged concentrically with respect to one another. In particular, the outer ring and the inner ring overlap by more than 60%, preferably by more than 70%, preferably by more than 80%, in particular by more than 90%.

The first and second chambers can be arranged between the inner ring and the outer ring. This makes it easy to incorporate the labyrinth structure to protect against moisture.

Preferably, it is the outer ring that has the vent openings.

The one or plural check valve(s) may be arranged in the inner ring.

For a simple and compact design, it is advantageous for the diaphragm to be formed as a diaphragm ring engaging around the inner ring In order to keep the housing cover as small as possible in size, the outer ring retains the diaphragm in place on the inner ring relative to the vent opening of the check valve. This eliminates the need for additional measures for fixing the diaphragm of the check valve in place.

For example, to prevent fluid coming from one side of the housing cover from entering the first chamber, a seal is arranged between the inner ring and the outer ring. The seal can be designed as an O-ring which is fitted on the inner ring via a groove made on the outside of the inner ring, or is fitted on the inside of the outer ring.

For easier manufacturing, the housing cover and at least the area of the protective housing associated with the housing cover can be rotationally symmetrical.

In processes in the chemical and petrochemical industries, the formation of an explosive atmosphere cannot usually be ruled out. In this case, the system components used, such as the electropneumatic field devices according to the invention, must meet special requirements with regard to explosion protection. In the case of the "Ex d" flameproof enclosure type of protection, the mode of operation is based on the containment of any explosion that may occur inside the housing, so that any transmission of the explosion to the atmosphere surrounding the housing is prevented. This is achieved by an explosion proof design of the housing together with ignition proof gaps at all housing openings, in which all electrical components that may ignite an explosive atmosphere are enclosed within the housing. The requirements for equipment of the flameproof enclosure type of protection are described in the German DIN EN 60079-1 standard. The protective housing is therefore designed especially for the requirements for explosion-proof operation, in particular according to DIN EN 60079-1.

In one embodiment of the invention, module slots for multiple electronic components and/or pneumatic components are provided in the protective housing. This makes it easy to create different variants of electropneumatic field devices with a uniform protective housing.

For example, the plug-in slot for the pneumatic component or a plurality of plug-in slots for pneumatic components may be provided on an end face of an internal structure of the protective housing.

Preferably, the vent openings in the housing cover are evenly distributed over the entire circumference of the housing cover. This minimizes the risk, for example, of the vent opening completely icing up from the outside during freezing rain.

In one embodiment of the invention, the pneumatic component is an I/P converter and/or the electronic component is a controller or a transducer.

Additional advantages, features and possible applications of the present invention may be noted from the following description in which reference is made to the embodiment illustrated in the drawings.

Throughout the description, the claims and the drawings, those terms and associated reference signs are used as are stated in the list of reference signs below. In the drawings.

FIGS. 1 to 4 are views of a module of one embodiment of an electropneumatic field device in the form of an electropneumatic positioner 10. This positioner 10 is used to monitor, control and/or regulate a control valve (not shown here) as part of a control valve arrangement of a process plant. The electropneumatic positioner 10 is connected to a pneumatic actuator of the control valve via a pneumatic line system. The control valve is actuated by the actuator for controlling the process fluid flow of a process plant and is regulated/controlled by the electropneumatic positioner 10.

The positioner 10 comprises a plurality of modules, although only one module associated with the pneumatics is shown here. The positioner 10 includes a protective housing 12. This protective housing 12 consists of several housing parts that are connected to one another in a modular fashion, in which the housing part 14 associated with the pneumatics is provided with a housing cover 16 on its end.

On its side of the housing portion 14 remote from the housing cover 16 there is a flange 18 having a plurality of evenly spaced flange segments integrated into the flange 18 about its periphery. The housing part 14 is connected to further modules of the protective housing 12 via the flange 18 and the flange segments 20.

FIGS. 1 through 4 are views of substantially the portion of the positioner 10 that comprises and relates to a pneumatic component 22. In addition, the positioner 10 includes electronic components 23, which are arranged on the end face of an internal structure 26 of the housing part 14 that is remote from the pneumatic component 22—not shown here—and are connected to an electric field input 25.

The pneumatic component 22 is arranged on the end face that faces the housing cover 16, of the internal structure 26 of the housing part 14. A pneumatic supply inlet 24 protrudes laterally from the protective housing 12 and is freely connectable for connection to a pneumatic source (not shown here). On the side of the pneumatic component 22 remote from the pneumatic supply inlet 24, a pneumatic field outlet 27 (not shown in detail here) is provided. The electronic component 23 is connected to the pneumatic component 22 for signaling purposes in a known manner and thereby controls or regulates the latter.

Figure 1:
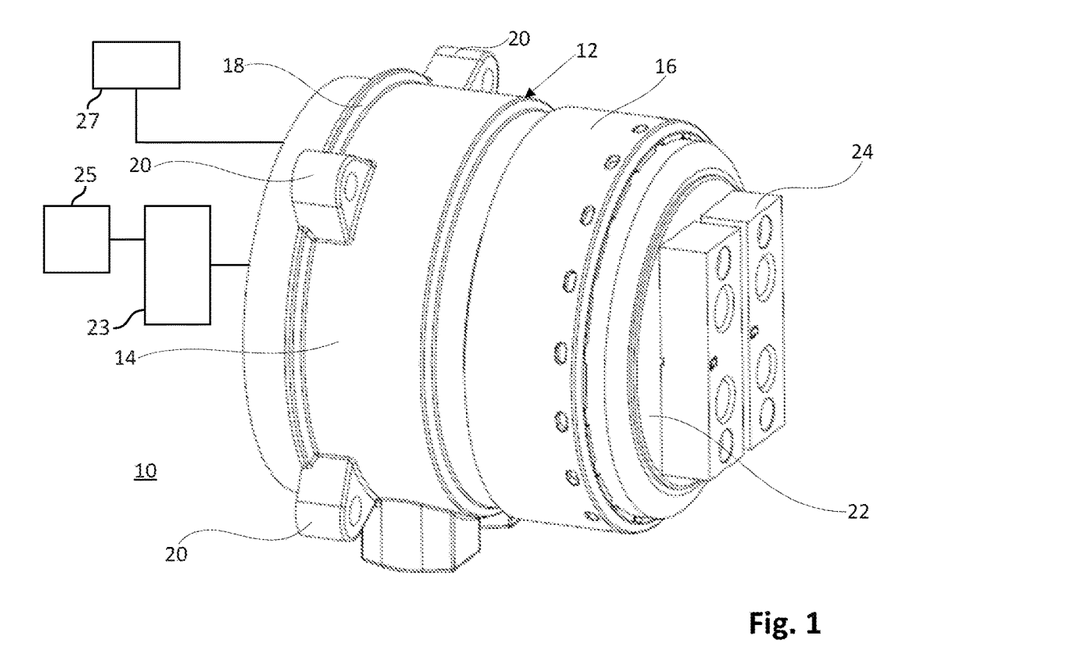
FIG. 1 is a perspective view of a module of the electropneumatic field device according to one embodiment of the invention.
Figure 2:
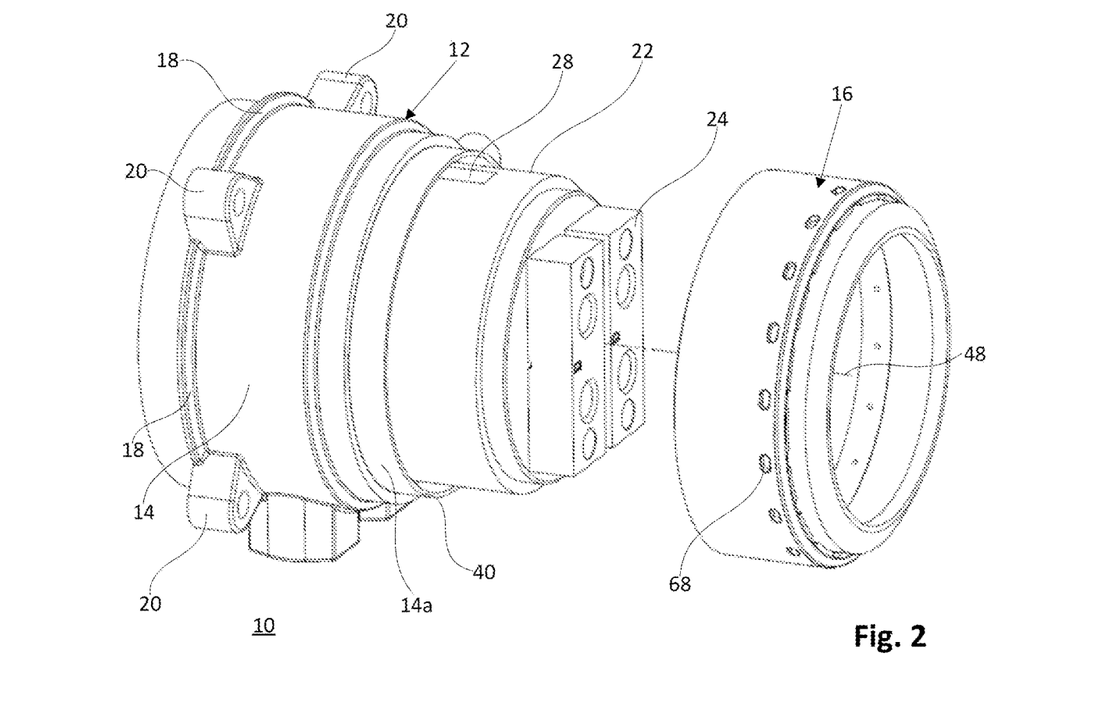
FIG. 2 is a perspective exploded view of the module of the electropneumatic field device of FIG. 1, with the housing cover removed.
Figure 3:
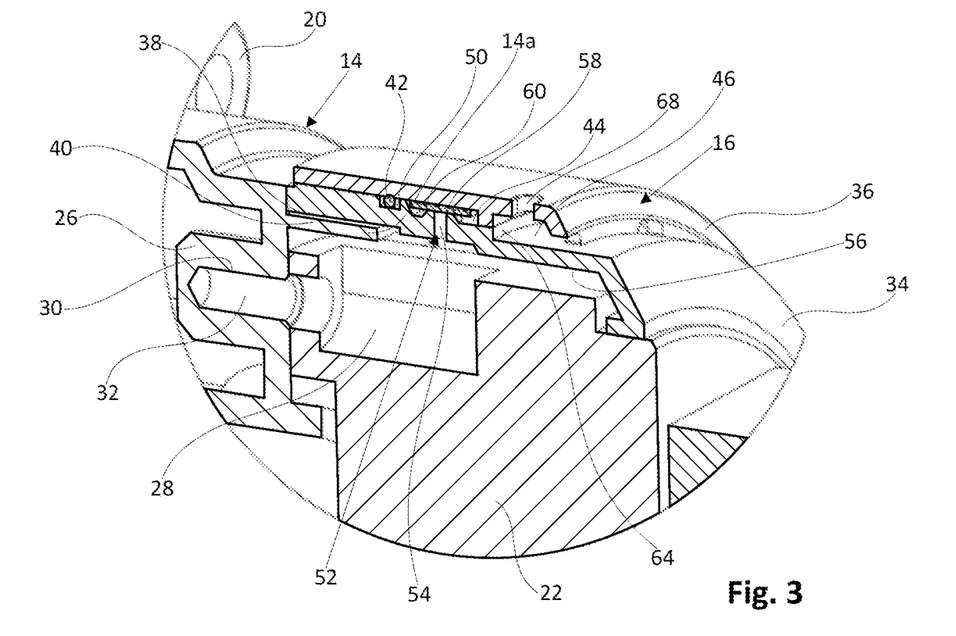
FIG. 3 is a detailed perspective view of a first longitudinal section through the module of the electropneumatic field device of FIG. 1.

Referring to FIG. 3, the pneumatic component 22 is screw-connected to the end face of the internal structure 26 of the housing part 14. For this purpose, two mounting recesses 28 offset by 180° are provided in the pneumatic component 22, which recesses are associated with corresponding threaded holes 30 in the end face of the internal structure 26 of the housing part 14. Via screws 32 associated with the threaded holes 30, the pneumatic component 22 is securely screwed to the internal structure 26 of the housing part 14, but can be released therefrom again and easily replaced or serviced, if required. All it takes to do this is simply removing the housing cover 16 and then unscrewing the screws 32.

The housing cover 16 is also screwed to the housing part 14 and thus releasably connected to it. For this purpose, the housing cover 16 has an internal thread 38 and the associated cylindrical area 14a of the internal structure 26 of the housing part 14 has an external thread 40. The external thread 40 of the internal structure 26 engages the internal thread 38 of the housing cover 16. Should the pneumatic component 22 need to be replaced or serviced, the housing cover 16 is unscrewed from the internal structure 26 by relatively rotating the internal threads 38 with respect to the external threads 40, and then removed from the housing part 14.

Figure 5:
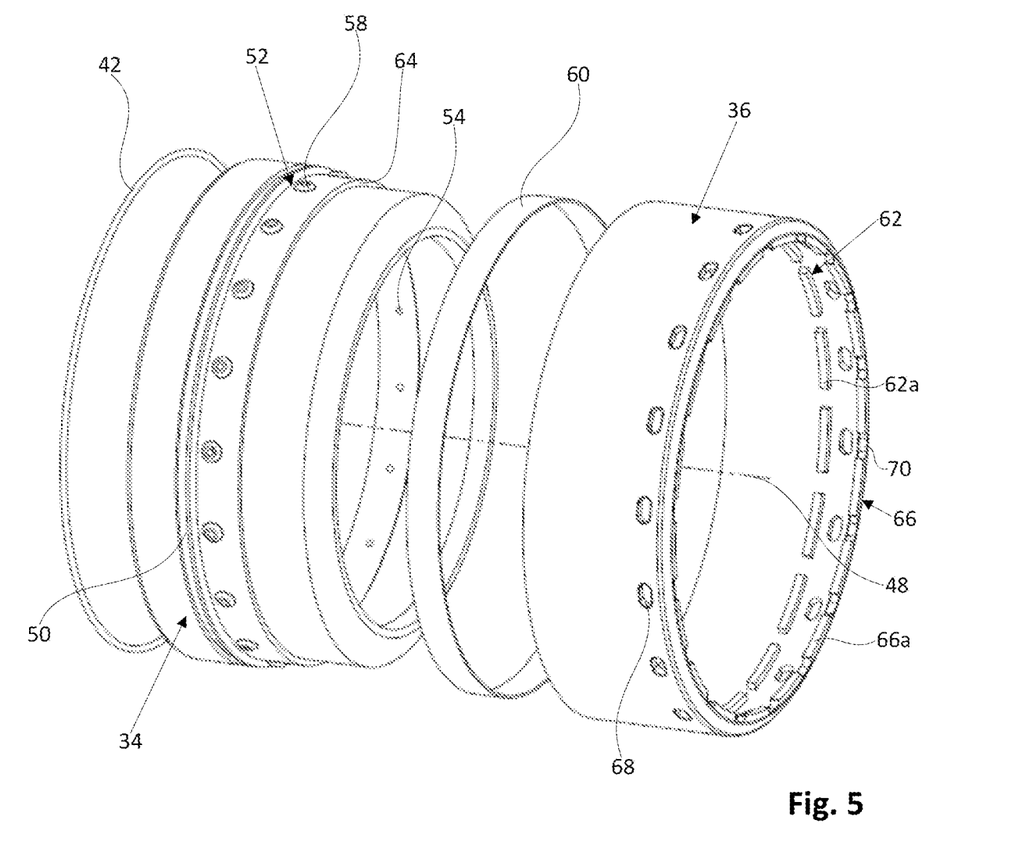
FIG. 5 is a perspective exploded view of the housing cover of the module of the electropneumatic field device according to one embodiment of the invention.

Furthermore, the housing cover 16 has a two-part design and comprises an inner ring 34, and an outer ring 36 arranged concentrically with respect thereto. The outer ring 36 overlaps the inner ring by more than 75%. With respect to the longitudinal axis 48 of the protective housing 12, the inner ring 34 is longer than the outer ring 36 and thus projects inwardly beyond the outer ring 36. The inner ring 34 extends substantially up to the free end of the pneumatic component 22 around which it fits flush. The outer ring 36 extends substantially from the plane of the internal structure 26 of the housing part 14, against which the pneumatic component 22 abuts, to about 20% to 25% less in the direction of the free end of the pneumatic component 22 than the inner ring 34. From the free end of the pneumatic component 22, the pneumatic supply inlet 24 extends further towards the free end of the module of the electropneumatic positioner 10 and thus also away from the free end of the inner ring 34.

Figure 4:
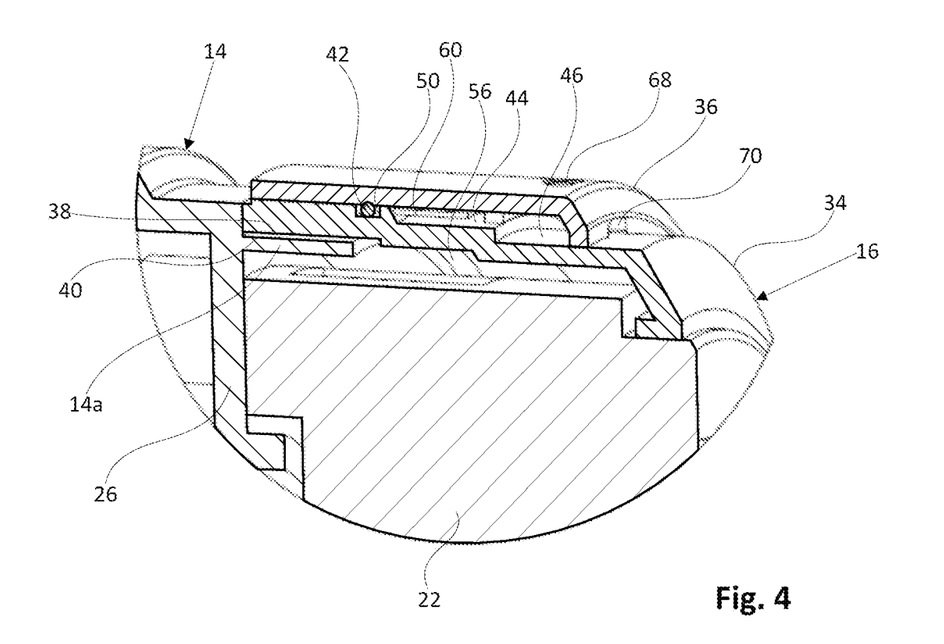
FIG. 4 is a detailed perspective view of a second longitudinal section through the module of the electropneumatic field device of FIG. 1.

As seen in the views of FIGS. 3 and 4, from left to right, the housing cover 16 has a seal 42, a first chamber 44, and a second chamber 46 between its inner ring 34 and its outer ring 36. The first chamber 44 and the second chamber 46 are fluidically arranged in series.

The outer side of the inner ring 34 is provided with a circumferential groove 50 which extends radially with respect to the longitudinal axis 48, in which groove 50 the seal 42 is inserted in the form of an O-ring seal. This protects the first chamber 44, for example, from any moisture which may enter from the flange side of the housing cover 16.

Arranged next to the groove 50 is the first chamber 44, which extends annularly by 360° C. in the circumferential direction between the inner ring 34 and the outer ring 36. Multiple check valves 52 are provided in the inner ring 34 and the first chamber 44. The check valves 52 are arranged radially in a plane perpendicular to the longitudinal axis 48, are equally spaced from one another, and are thus evenly distributed around the circumference of the inner ring 34.

A check valve 52 includes a vent hole 54 that extends radially inwardly through the inner ring 34. The vent hole 54 connects an interior 56 of the protective housing 12 to the first chamber 44. A vent opening 58 of the check valve 52 is provided in the region of the first chamber 44, which vent opening is raised with respect to the adjacent region of the outer surface of the inner ring 34 in the first chamber 44. This for example prevents condensed water accumulated in the first chamber 44 from reaching the interior 56 of the protective housing 12 via the vent opening 58 and the vent hole 54.

A diaphragm ring 60 covers all vent openings 58 in the first chamber 44. The diaphragm ring 60 is part of each of the check valves 52 and is mounted on the vent openings 58 between the inner ring 34 and the outer ring 36. The diaphragm ring 60 is designed as an elastic sealing ring. If the pressure in the interior 56 of the protective housing 12 exceeds a certain threshold value, the diaphragm ring 60 rises in the area of the vent opening 58 and ensures pressure equalization between the interior 56 and the first chamber 54.

The threshold value is determined by the spring force of the diaphragm ring 60 in the area of the vent opening 58. For the spring force, it is not only relevant what the dimensions the diaphragm ring 60 has and what material is selected with regard to the modulus of elasticity, but also how strongly the diaphragm ring is compressed between the inner ring 34 and outer ring 36 in the area of the vent openings 58. The reduction in distance between the inner ring 34 and the outer ring 36 as a result of the raised area of the vent opening 58 is what holds the diaphragm ring 60 in place in the first chamber 44.

The first chamber 44 is separated from the second chamber 46 by a segmented first web 62 disposed in a radial plane with respect to the longitudinal axis 48. The segmented first web 62 comprises individual web portions 62a, which are arranged evenly spaced from each other and form the segmented first web 62. The segmented first web 62 is an integral part of the outer ring 36, disposed on the inside of the outer ring 36 and thus faces the outside of the inner ring 34. More specifically, the segmented first web 62 is adjacent to a step-like shoulder 64 on the outside of the inner ring 34 that is disposed in a radial plane with respect to the longitudinal axis 48. The shoulder 64 slopes downward towards the free end of the pneumatic component 22.

On the side remote from the first web 62 toward the free end of the pneumatic component 22, the second chamber 46 is bounded by a second web 66 that is also segmented. The segmented second web 66 comprises individual web portions 66a, which are arranged evenly spaced from each other. The segmented second web 66 is an integral part of the outer ring 36, disposed on the inside of the outer ring 36 and thus faces the outside of the inner ring 34. Openings 70 are located between the web portions 66a.

Providing the first web 62 and the second web 66 with a segmented design permits, in case of venting, air from the first chamber 44 to escape through adjacent web portions 62a into the second chamber 46 and from there through adjacent web portions 66a into the environment.

In addition, multiple recesses 68 are provided on the cylindrical outer wall of the outer ring 36, which pass through the outer ring 36 and connect the second chamber 46 with the environment. Thus, in the case of venting, this also allows air from the second chamber 46 to escape into the environment via the recesses 68. The recesses 68 are likewise equally spaced from one another about the circumference of the outer ring 36 in a radial plane with respect to the longitudinal axis 48.

The protective housing 12 is designed for explosion-proof applications according to DIN EN 60079-1.

The pneumatic component 22 is an I/P converter. The electronic component 23 may be a controller and/or a transducer.

The invention is characterized in that, in case of venting of the pneumatic component 22, the excess pressure in the interior 56 of the protective housing 12 can be equalized in a simple manner via check valves 52 to the first chamber 44, then to the second chamber 46 and finally via the recesses 68 or the openings 70 formed by the segmented web 66. This ensures a compact design and an easy-to-manufacture structure. The threshold value of venting via the check valve 52 can be adjusted by selecting a diaphragm ring 60 of appropriate dimensions and modulus of elasticity.

This design allows the fluid flowing out of the pneumatic component 22 in case of venting to be successively depressurized via the interior 56, the first chamber 44 and the second chamber 46. This considerably reduces the danger to the immediate surroundings of the protective housing in case of venting.

The first web 62, the shoulder 64 in cooperation with the second web 66, the recesses 68 and the openings form a kind of labyrinth seal to prevent moisture from entering into the second chamber 46, especially into the first chamber 44.

Because the recesses 68 are located radially and the openings 70 are located axially on the circumference of the outer ring, jet water entering the second chamber 46 can easily drain off again without entering into the first chamber 44. If water does enter into the first chamber, it will be non-pressurized and the elastic seal of the check valve 52, i.e. the diaphragm ring 60, will prevent it from continuing on further and into the interior 56 of the protective housing 12.

The openings 70 and recesses 68 arranged around the circumference of the outer ring 36 minimize the risk of a complete failure of the ventilation device of the module 10 of the electropneumatic field device due to icing in cold temperatures.

The housing cover 16 extends substantially the length of the pneumatic component 22, thus providing a quick response time of the ventilation device in case of venting, since the ventilation device is arranged close to a possible source of excess pressure.

The protective housing 12 and the housing cover 16 are substantially rotationally symmetrical so as to make them easy to manufacture.

LIST OF REFERENCE SIGNS 10 electropneumatic positioner
12 protective housing
14 housing part
14a cylindrical area of housing part 14
16 housing cover
18 flange
20 flange segment
22 pneumatic component
24 pneumatic supply inlet
26 internal structure of protective housing 12
28 mounting recess
30 threaded hole
32 screw
34 inner ring of housing cover 16
36 outer ring of housing cover 16
38 female thread of housing cover 16
40 external thread of cylindrical area 14a of housing part 14
42 seal
44 first chamber
46 second chamber
48 longitudinal axis
50 groove
52 check valve
54 vent hole
56 interior of protective housing 12
58 vent opening
60 diaphragm ring
62 first web
62a web portion of first web 62
64 shoulder
66 second web
66a web portion of second web 66
68 recesses
70 openings

The invention claimed is:

1. An electropneumatic field device, comprising a protective housing which has a housing cover and a ventilation device, wherein protective housing further includes at least one pneumatic component and a structure for mounting at least one electronic component, the protective housing is configured to operatively receive at least one electric field input, at least one pneumatic supply inlet and at least one pneumatic field outlet, such that the at least one electronic component is connectable to the electric field input, the at least one pneumatic component is connectable to the pneumatic supply inlet and the pneumatic field outlet, the pneumatic component is connectable to the electronic component for signaling purposes, the ventilation device is associated with the at least one pneumatic component, wherein the pneumatic component is at least partly surrounded by the housing cover which is releasably connected to the protective housing, and the ventilation device is integrated into the housing cover, wherein the ventilation device comprises first and second chambers that are arranged in series, wherein the first chamber comprises at least one check valve which is connected to an interior space of the protective housing in such a way that, when the pneumatic component is vented, air flows from this interior space through the check valve into the first chamber, then into the second chamber and then out of the second chamber and out of the protective housing, wherein a labyrinth seal is provided which protects the first chamber and the second chamber from moisture entering into them, but which still allows venting of the pneumatic component via the check valve and the first and second chambers, wherein the second chamber has vent openings that are arranged laterally on, and/or on the front face of, the housing cover, which vent openings connect the second chamber to the outside and are part of the labyrinth seal, and wherein the vent openings are raised relative to its adjacent region on the side facing a diaphragm.

2. An electropneumatic field device according to claim 1, wherein the protective housing is configured to receive at least one of the electronic component and the electric field input in an area that is remote from the housing cover.

3. An electropneumatic field device according to claim 1, wherein the housing cover surrounds the pneumatic supply inlet in such a way that the latter can be freely connected to a pneumatic source.

4. An electropneumatic field device according to claim 1, wherein the housing cover laterally encloses the entire pneumatic component.

5. An electropneumatic field device according to claim 1, wherein the labyrinth seal comprises a segmented web that separates the first chamber from the second chamber.

6. An electropneumatic field device according to claim 1, wherein the labyrinth seal is formed by at least one shoulder that is disposed between the first chamber and the second chamber and that slopes downward toward the pneumatic supply inlet.

7. An electropneumatic field device according to claim 1, wherein the check valve is formed by the diaphragm disposed over a vent opening, which vent opening interconnects the interior of the protective housing and the first chamber.

8. An electropneumatic field device according to claim 7, wherein the diaphragm is held in place on an inner ring by an outer ring relative to the vent opening of the check valve.

9. An electropneumatic field device according to claim 7, wherein the diaphragm is formed as a diaphragm ring that engages around an inner ring.

10. An electropneumatic field device according to claim 1, wherein multiple check valves are provided, which check valves are arranged at uniform distances from one another over the circumference, in a plane perpendicular to a longitudinal axis of the protective housing.

11. An electropneumatic field device according to claim 1, wherein the housing cover is of a two-part design and comprises an inner ring and an outer ring, which are arranged concentrically to one another, which outer ring and inner ring overlap by at least one of more than 60%, by more than 70%, by more than 80%, and by more than 90%.

12. An electropneumatic field device according to claim 11, wherein the outer ring includes vent holes.

13. An electropneumatic field device according to claim 1, wherein the first and second chambers are disposed between an inner ring and an outer ring.

14. An electropneumatic field device according to claim 1, wherein a seal is arranged between an inner ring and an outer ring in order to prevent fluid from penetrating into the first chamber from one side of the housing cover, an O-ring as said seal being fitted in a groove made in the inner ring or the outer ring on the side facing the respective other.

15. An electropneumatic field device according to claim 1, wherein the protective housing is designed to meet the requirements for explosion-proof operation according to DIN EN 60079-1.

16. An electropneumatic field device according to claim 1, wherein module slots for multiple electronic components and/or pneumatic components are provided in the protective housing.

17. An electropneumatic field device according to claim 16, wherein a plug-in slot for the pneumatic component or multiple plug-in slots for pneumatic components are provided on an end face of an internal structure of the protective housing.

18. An electropneumatic field device according to claim 1, wherein vent openings are arranged in the housing cover and are uniformly distributed over the entire circumference of the housing cover.

19. An electropneumatic field device according to claim 1, wherein the pneumatic component is an I/P converter.

20. An electropneumatic field device according to claim 1, wherein the electronic component is a controller or a transducer.

21. An electropneumatic field device comprising a protective housing which has a housing cover and a ventilation device, wherein protective housing further includes at least one pneumatic component and a structure for mounting at least one electronic component, the protective housing is configured to operatively receive at least one electric field input, at least one pneumatic supply inlet and at least one pneumatic field outlet, such that the at least one electronic component is connectable to the electric field input, the at least one pneumatic component is connectable to the pneumatic supply inlet and the pneumatic field outlet, the pneumatic component is connectable to the electronic component for signaling purposes, the ventilation device is associated with the at least one pneumatic component, wherein the pneumatic component is at least partly surrounded by the housing cover which is releasably connected to the protective housing, and the ventilation device is integrated into the housing cover, wherein the ventilation device comprises first and second chambers that are arranged in series, wherein the first chamber comprises at least one check valve which is connected to an interior space of the protective housing in such a way that, when the pneumatic component is vented, air flows from this interior space through the check valve into the first chamber, then into the second chamber and then out of the second chamber and out of the protective housing, and wherein the at least one check valve is arranged in an inner ring.

22. An electropneumatic field device, comprising a protective housing which has a housing cover and a ventilation device,
   wherein protective housing further includes at least one pneumatic component and a structure for mounting at least one electronic component, the protective housing is configured to operatively receive at least one electric field input, at least one pneumatic supply inlet and at least one pneumatic field outlet, such that the at least one electronic component is connectable to the electric field input, the at least one pneumatic component is connectable to the pneumatic supply inlet and the pneumatic field outlet, the pneumatic component is connectable to the electronic component for signaling purposes, the ventilation device is associated with the at least one pneumatic component,
   wherein the pneumatic component is at least partly surrounded by the housing cover which is releasably connected to the protective housing, and the ventilation device is integrated into the housing cover, and
   wherein the housing cover and at least an area of the protective housing associated with the housing cover are rotationally symmetrical.

\* \* \* \* \*